(12) United States Patent
Wu et al.

(10) Patent No.: US 9,715,248 B2
(45) Date of Patent: Jul. 25, 2017

(54) BASE FOR ELECTRONIC DEVICE AND ELECTRONIC DEVICE ASSEMBLY

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Shu-Qi Wu, Wuhan (CN); Yong-Chang Fan, Wuhan (CN); Yu-Lin Liu, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/751,930

(22) Filed: Jun. 26, 2015

(65) Prior Publication Data

US 2016/0313761 A1    Oct. 27, 2016

(30) Foreign Application Priority Data

Apr. 27, 2015   (CN) .......................... 2015 1 0204015

(51) Int. Cl.
| | |
|---|---|
| *G06F 1/16* | (2006.01) |
| *A45C 11/00* | (2006.01) |
| *F16M 13/02* | (2006.01) |
| *G06F 1/18* | (2006.01) |

(52) U.S. Cl.
CPC ............... *G06F 1/16* (2013.01); *F16M 13/02* (2013.01); *G06F 1/1607* (2013.01); *G06F 1/1632* (2013.01); *G06F 1/181* (2013.01); *A45C 2011/003* (2013.01); *G06F 2200/1612* (2013.01); *G06F 2200/1631* (2013.01); *G06F 2200/1633* (2013.01)

(58) Field of Classification Search
CPC . F16M 13/00; A45C 2011/003; G06F 1/1628; G06F 1/1632; G06F 2200/1633
See application file for complete search history.

(56) References Cited

U.S. PATENT DOCUMENTS

| | | | | |
|---|---|---|---|---|
| 3,195,850 | A * | 7/1965 | Steiner ................. | A47B 23/043 206/45.2 |
| 5,607,135 | A * | 3/1997 | Yamada ............... | A47B 23/043 248/447 |
| 5,687,060 | A * | 11/1997 | Ruch ....................... | G06F 1/181 361/679.43 |
| 6,082,696 | A * | 7/2000 | Patterson ............... | F16M 11/00 248/447 |
| 6,352,233 | B1 * | 3/2002 | Barberich .......... | A47B 21/0314 248/456 |

(Continued)

*Primary Examiner* — Adrian S Wilson
(74) *Attorney, Agent, or Firm* — Steven Reiss

(57) ABSTRACT

A supporting base for an electronic device includes a mounting plate and two standing pieces. The two standing pieces are rotatably fixed to the mounting plate. The two standing pieces can rotate from a closed position to an open position. When the two standing pieces are in the closed position, the mounting plate supports the electronic device in a first manner. When the two pieces are in the open position, the two pieces clamp the electronic device in a second manner. An electronic device assembly is also provided.

13 Claims, 6 Drawing Sheets

(56) References Cited

U.S. PATENT DOCUMENTS

| | | | | |
|---|---|---|---|---|
| 6,568,543 B1* | 5/2003 | Schneider | | A47B 65/20 211/42 |
| 6,700,775 B1* | 3/2004 | Chuang | | G06F 1/1626 361/679.01 |
| 6,805,327 B1* | 10/2004 | Shen | | A47B 91/02 248/346.07 |
| 6,882,524 B2* | 4/2005 | Ulla | | G06F 1/1626 345/169 |
| 6,923,414 B2* | 8/2005 | Shida | | F16M 11/00 248/346.07 |
| 6,986,492 B2* | 1/2006 | Huang | | G06F 1/1632 248/346.03 |
| 6,992,882 B2* | 1/2006 | Wang | | G06F 1/1632 248/279.1 |
| 7,516,933 B2* | 4/2009 | Moon | | H04M 1/04 248/441.1 |
| 7,527,228 B2* | 5/2009 | Chung | | F16M 11/00 248/154 |
| D626,964 S* | 11/2010 | Richardson | | D14/447 |
| 7,861,995 B2* | 1/2011 | Liou | | F16M 11/10 248/454 |
| 8,100,376 B2* | 1/2012 | Ye | | A47B 23/043 248/454 |
| D667,012 S* | 9/2012 | Chen | | D14/447 |
| D676,853 S* | 2/2013 | Gengler | | D14/447 |
| 8,477,493 B2* | 7/2013 | Wu | | F16M 11/10 361/679.55 |
| D695,747 S* | 12/2013 | Hobbs | | D14/447 |
| 8,611,076 B2* | 12/2013 | Wetzel | | F16M 11/105 248/121 |
| 8,616,508 B1* | 12/2013 | Coleman | | F16M 11/10 248/176.1 |
| D705,785 S* | 5/2014 | Wang | | D14/447 |
| 8,746,638 B2* | 6/2014 | Carney | | H04M 1/0202 248/176.1 |
| 8,749,960 B2* | 6/2014 | Mori | | H05K 5/0086 248/346.03 |
| 8,876,070 B2* | 11/2014 | Liu | | F16M 11/24 16/369 |
| 8,910,915 B2* | 12/2014 | Wibby | | A47B 23/043 206/45.2 |
| 8,919,544 B2* | 12/2014 | Lee | | G06F 1/1626 206/320 |
| 9,025,327 B2* | 5/2015 | Noguchi | | G06F 1/1632 361/679.17 |
| 9,033,147 B2* | 5/2015 | Lee | | A45C 11/00 206/320 |
| 9,211,001 B2* | 12/2015 | Negretti | | A47B 23/04 |
| 9,356,640 B2* | 5/2016 | Lambert | | H04B 1/3877 |
| 9,377,810 B2* | 6/2016 | Hishinuma | | G06F 1/1613 |
| 2002/0122291 A1* | 9/2002 | Hubbard | | F16M 11/00 361/679.09 |
| 2005/0139740 A1* | 6/2005 | Chen | | F16M 11/10 248/286.1 |
| 2005/0162824 A1* | 7/2005 | Thompson | | G06F 1/1632 361/679.41 |
| 2007/0001082 A1* | 1/2007 | Prokop | | A47B 97/00 248/346.01 |
| 2008/0117582 A1* | 5/2008 | Lai | | G06F 1/1632 361/825 |
| 2008/0123275 A1* | 5/2008 | Lai | | G06F 1/181 361/809 |
| 2010/0213331 A1* | 8/2010 | Liou | | F16M 11/10 248/176.3 |
| 2011/0075349 A1* | 3/2011 | Ma | | G06F 1/1632 361/679.41 |
| 2011/0278421 A1* | 11/2011 | Guldalian | | A47B 23/00 248/459 |
| 2011/0304967 A1* | 12/2011 | Ma | | G06F 1/1632 361/679.04 |
| 2012/0106054 A1* | 5/2012 | Royz | | F16M 11/10 361/679.3 |
| 2012/0146466 A1* | 6/2012 | Lu | | A45C 7/0036 312/223.1 |
| 2012/0188699 A1* | 7/2012 | Sun | | G06F 1/1616 361/679.26 |
| 2012/0318950 A1* | 12/2012 | Wilber | | A47B 23/043 248/459 |
| 2012/0325689 A1* | 12/2012 | Wibby | | A47B 23/043 206/45.2 |
| 2013/0068916 A1* | 3/2013 | Mensing | | F16M 11/048 248/558 |
| 2013/0165188 A1* | 6/2013 | Carney | | H04M 1/0202 455/575.1 |

\* cited by examiner

BASE FOR ELECTRONIC DEVICE AND ELECTRONIC DEVICE ASSEMBLY

CROSS-REFERENCE TO RELATED APPLICATIONS

This application claims priority to Chinese Patent Application No. 201510204015.4 filed on Apr. 27, 2015, the contents of which are incorporated by reference herein.

FIELD

The subject matter herein generally relates to electronic device supports.

BACKGROUND

The computer includes a chassis. Some chassis are slim and can be placed where desired, such as a desk, an enclosure of an electronic device, or even a wall. The chassis can be fixed in place through a base.

BRIEF DESCRIPTION OF THE DRAWINGS

Implementations of the present technology will now be described, by way of example only, with reference to the attached figures.

DETAILED DESCRIPTION

Figure 1:
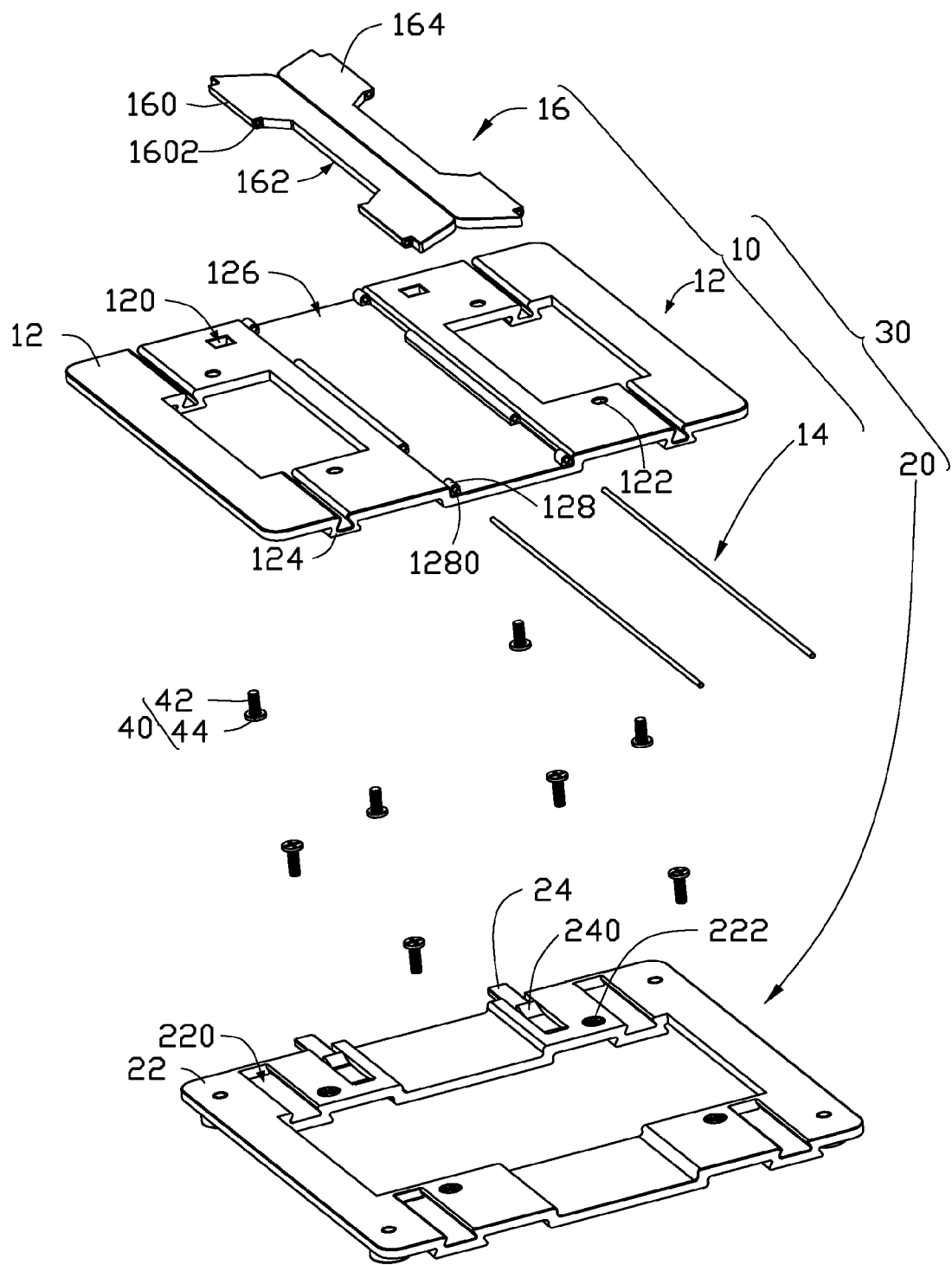
FIG. 1 is an exploded, isometric view of one embodiment of a base for electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to a base for an electronic device.

Figure 2:
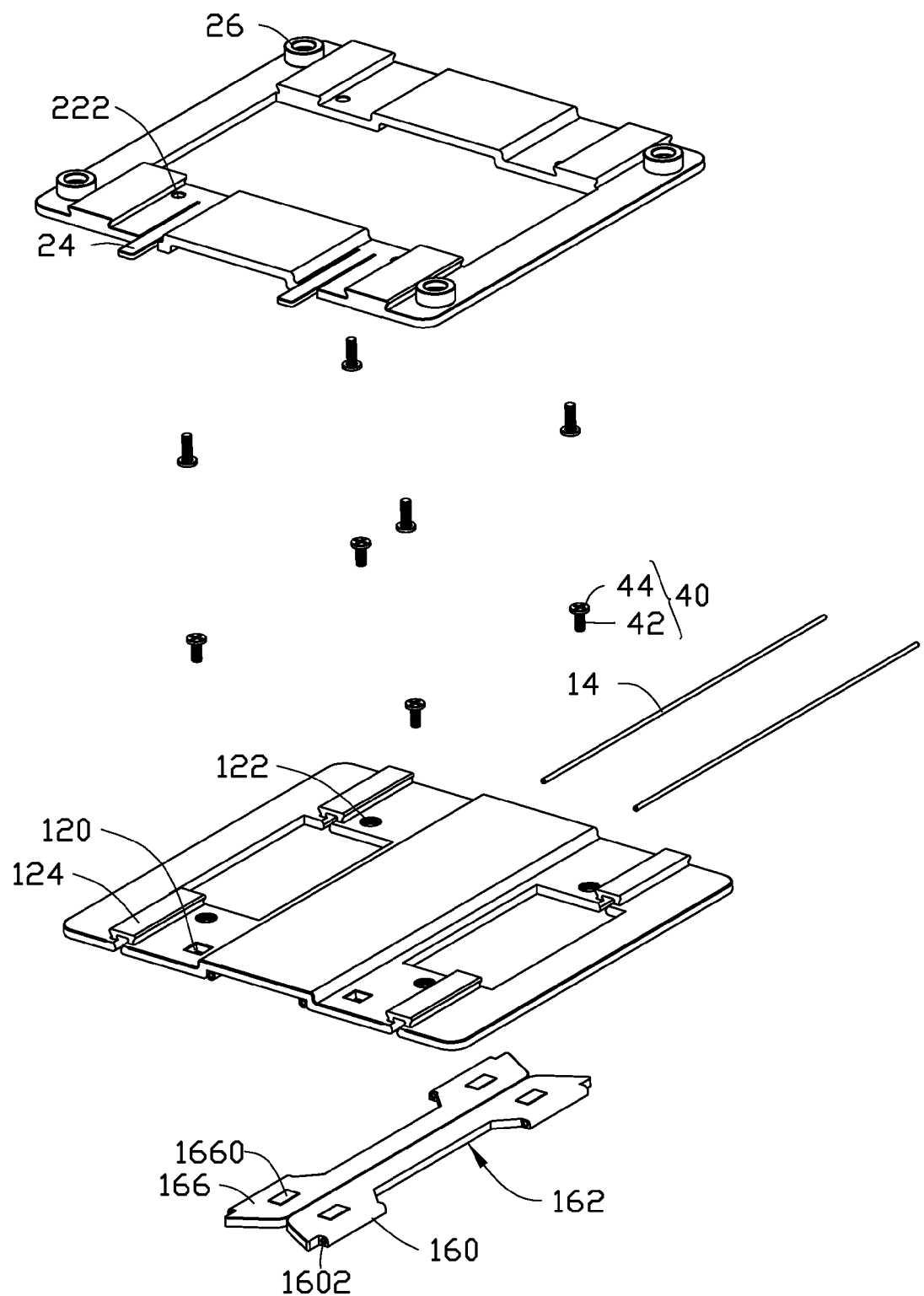
FIG. 2 is similar to FIG. 1, but viewed from another angle.

FIGS. 1-2 illustrate one embodiment of a base 100. The base 100 includes a mounting plate 30 and a plurality of fixing members 40 (e.g., pins). The mounting plate 30 includes a first mounting plate 10 and a second mounting plate 20.

The first mounting plate 10 includes a first plate 12, two shafts 14, and two standing pieces 16. The first plate 12 defines two locking holes 120, a plurality of first fixing holes 122, and a receiving space 126. The two locking holes 120 are located on one end of the first plate 12. The first plate 12 includes two connecting portions 124 and a plurality of pivot portions 128 (e.g., hinges). The two connecting portions 124 are located on two sides of the receiving space 126. Each connecting portion 124 is formed by a recess in the first plate 12. The plurality of pivot portions 128 are spaced from each other and located on two sides of the receiving space 126. Each pivot portion 128 defines a shaft hole 1280. In one embodiment, a cross section of each connecting portion 124 can be substantially trapezoidal. Each first fixing hole 122 can be a counterbore. Each standing piece 16 includes two mounting portions 160, an outer surface 164, and an inner surface 166. Each standing piece 16 defines an opening 162. The opening 162 is located between the two mounting portions 160. The two mounting portions 160 and the opening 162 are located on one side of the standing piece 16. Each mounting portion 160 defines a mounting hole 1602. Each inner surface 166 includes two mats 1660. In one embodiment, each standing piece 16 can be substantially arched. Each mat 1660 can be made of rubber.

The second mounting plate 20 includes a second plate 22, two strips 24, and a plurality of gaskets 26. The two strips 24 extend from one end of the second plate 22. The plurality of gaskets 26 is fixed on one side of the second plate 22. The second plate 22 defines four connecting grooves 220 and a plurality of second fixing holes 222. Each strip 24 includes a protrusion 240.

Each fixing member 40 includes a post 42 and a fixing end 44. The post 42 extends from the fixing end 44.

Figure 3:
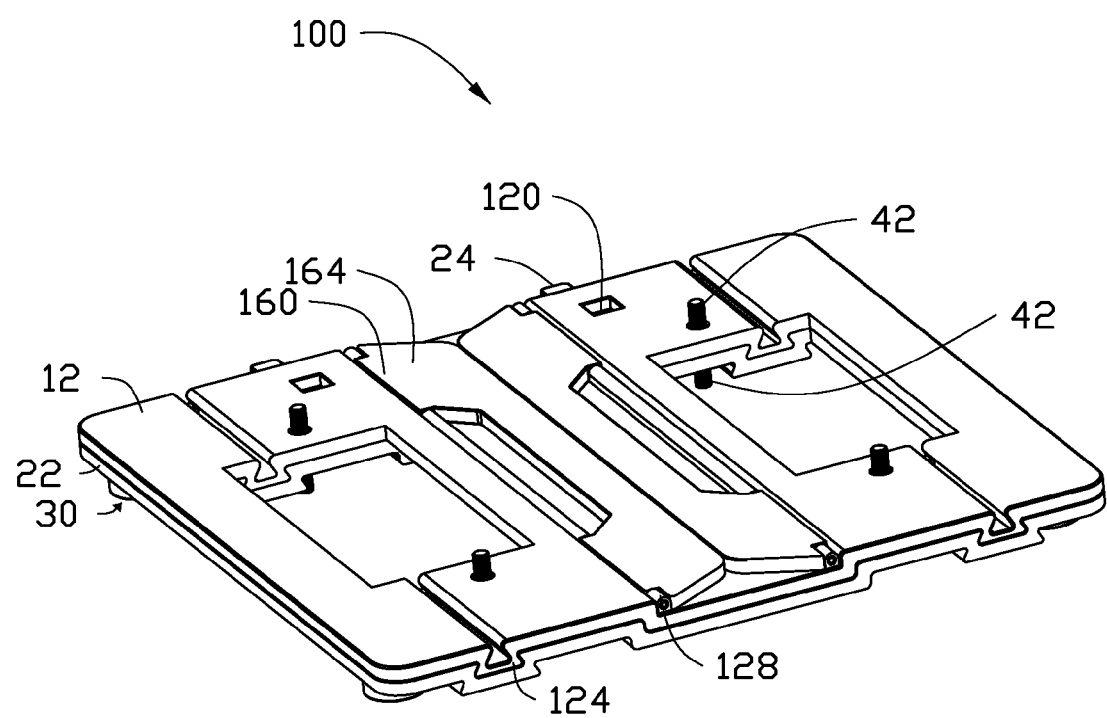
FIG. 3 is an assembled, isometric view of the base of FIG. 1.

FIG. 3 illustrates the base 100 assembled. The two standing pieces 16 are received in the receiving space 126. Each mounting portion 160 is located between two of the plurality of pivot portions 128. Each shaft 14 is engaged with the shaft hole 1280 and mounting hole 1602. The two standing pieces 16 are rotatably fixed to two sides of the receiving space 126. One or more of the plurality of fixing ends 44 are received in the first fixing holes 122. The posts 42 pass through the first fixing holes 122. Other fixing ends 44 are received in the second fixing holes 222. The posts 42 pass through the second fixing holes 222. The two connecting portions 124 are engaged with the four connecting grooves 220. The two protrusions 240 of the two strips 24 are received in the two locking holes 120 to prevent the two connecting portions 124 from moving from the four connecting grooves 220. The first mounting plate 10 is fixed to the second mounting plate 20.

Figure 4:
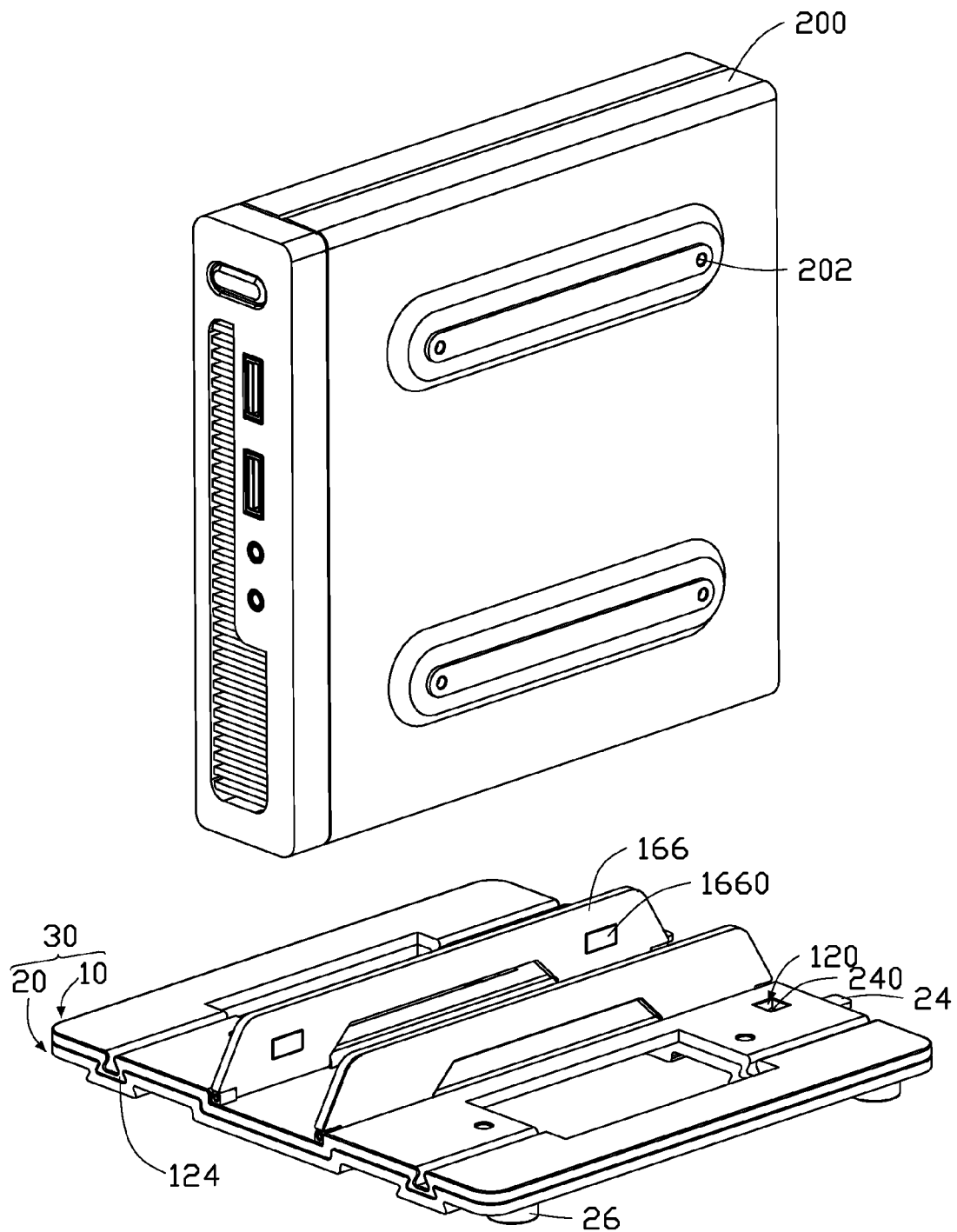
FIG. 4 is an isometric view of the base of FIG. 1, fixed to an electronic device in a first manner.

FIG. 4 illustrates one embodiment of a base 100 fixed with an electronic device 200 in a first manner. The two standing pieces 16 are configured to rotate from a closed position to an open position relative to the first plate 12. When the two standing pieces 16 are in the closed position, the two standing pieces 16 are received in the receiving space 126. The outer surface 164 and the first plate 12 are substantially aligned in a plane. When the two standing pieces 16 are in the open position, the two standing pieces 16 can be substantially parallel to each other and can be substantially perpendicular to the first plate 12. The electronic device 200 is clamped between the two standing pieces 16 and is engaged with the two mats 1660. The plurality of gaskets 26 is located on a plane. The electronic device 200 can be substantially perpendicular to the base 100. In one embodiment, the electronic device 200 can be a mini chassis.

Figure 5:
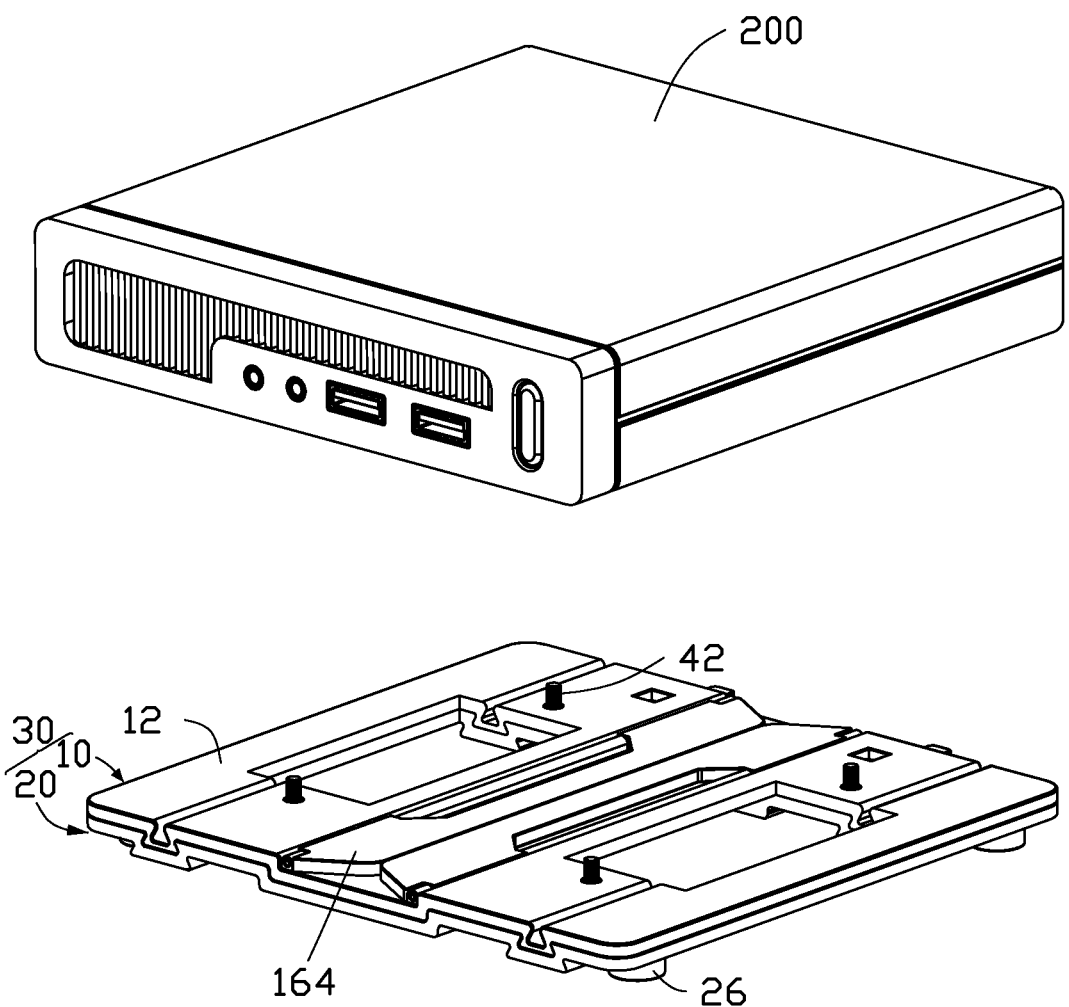
FIG. 5 is an isometric view of the base of FIG. 1, fixed to the electronic device in a second manner.

FIG. 5 illustrates one embodiment of a base 100 fixed to an electronic device 200 in a second manner. The two standing pieces 16 are in the closed position. The electronic device 200 defines a plurality of fastening holes 202 (shown in FIG. 4). The post 42 passes through the first fixing hole 122 and is fixed with the fastening holes 202 of the electronic device 200. The first mounting plate 10 is fixed to the electronic device 200. The first mounting plate 10 is engaged with the second mounting plate 20. The plurality of gaskets 26 is located on a plane. The electronic device 200 is horizontally located on the base 100.

Figure 6:
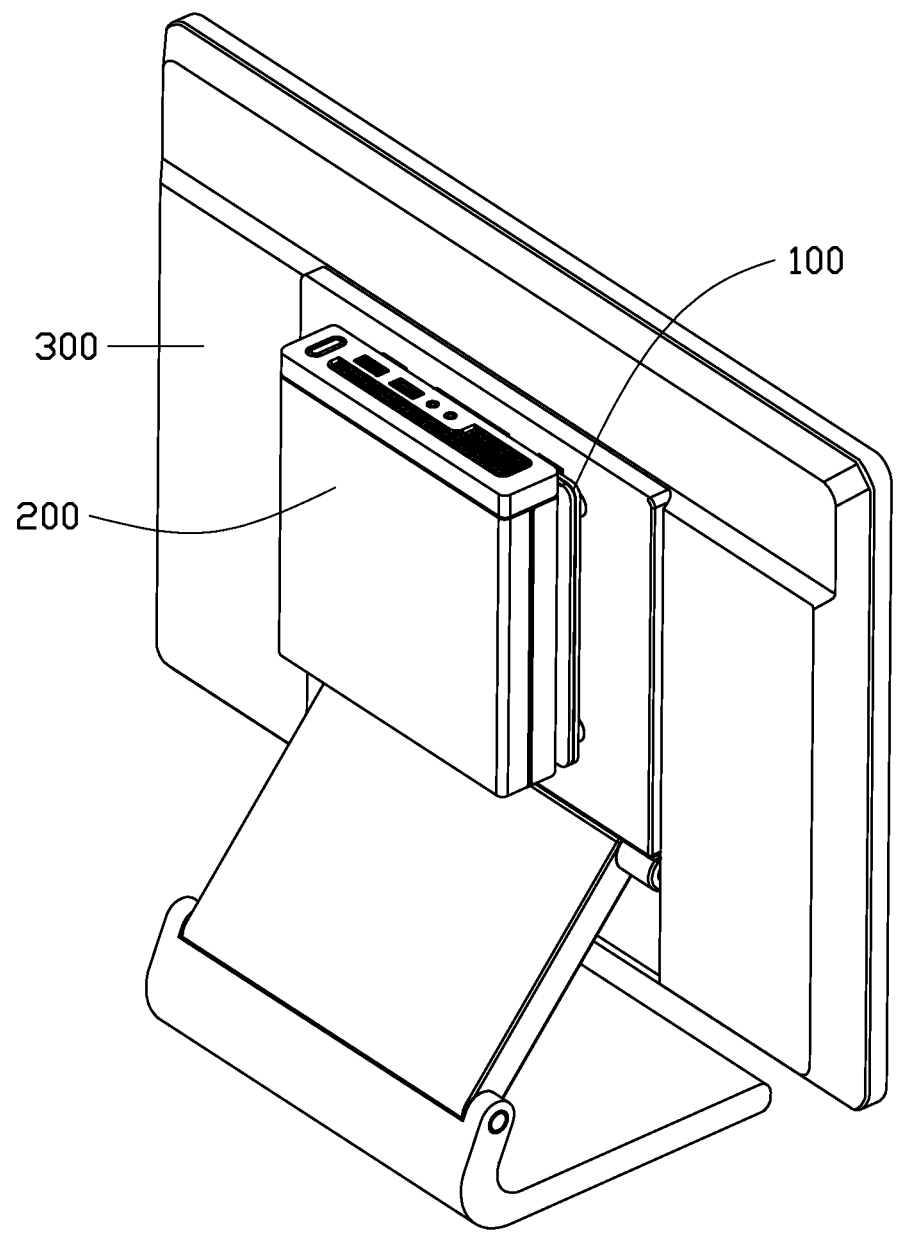
FIG. 6 is an isometric view of the base of FIG. 1, fixed to a shell.

FIG. 6 illustrates one embodiment of a base 100 fixed with a shell 300. The two standing pieces 16 are in the closed position. The electronic device 200 defines a plurality of fastening holes 202 (shown in FIG. 4). The shell 300 defines a plurality of screw holes (not shown in the figures). Some of fixing members 40 are engaged with the first mounting plate 10 and the electronic device 200 to fix the first mounting plate 10 to the electronic device 200. Other fixing members 40 are engaged with the second mounting plate 20 and the shell 300 to fix the second mounting plate 20 to the shell 300. The first mounting plate 10 is engaged with the second mounting plate 20. The electronic device 200 is fixed to the shell 300. In one embodiment, the shell 300 can be a display.

The embodiments shown and described above are only examples. Many details are often found in the art such as the other features of a base for electronic device. Therefore, many such details are neither shown nor described. Even though numerous characteristics and advantages of the present technology have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A base for an electronic device comprising:
a mounting plate; and
two standing pieces rotatably fixed to the mounting plate;
wherein the two standing pieces are configured to rotate from a closed position to an open position, when the two standing pieces are in the closed position, the mounting plate is configured to support and fix the electronic device; and when the two pieces are in the open position, the two standing pieces are configured to clamp the electronic device; the mounting plate comprises a first mounting plate and a second mounting plate, the first mounting plate comprises a connecting portion, the second mounting plate defines a connecting groove, and the connecting portion is engaged with the connecting groove; the first mounting plate comprises a first plate, and the connecting portion is formed by a recess of the first plate; a cross section of each connecting portion is substantially trapezoidal.

2. The base of claim 1, wherein when the two standing pieces are in the closed position, the two standing pieces are horizontally located on the base; and when the two standing pieces are in the open position, the two standing pieces are substantially perpendicular to the base.

3. The base of claim 1, wherein the first plate defines two locking holes, the second mounting plate comprises two protrusions, and two protrusions are received in the two locking holes to prevent the connecting portion from moving out of the connecting groove.

4. The base of claim 3, wherein the second mounting plate comprises a second plate and two strips, the two strips extend from one end of the second plate, the two protrusions are located on the two strips, and the two strips are configured to be deformed to push the two protrusions out of the two locking holes.

5. The base of claim 1, wherein the first plate defines a receiving space, the two standing pieces are rotatably fixed to two sides of the receiving space, each standing piece comprises an outer surface, and when the two standing pieces are in the closed position, the outer surface and the first plate are substantially aligned in a plane.

6. The base of claim 1 further comprises a plurality of fixing members, wherein the first mounting plate is fixed to the electronic device via the plurality of fixing members, the second mounting plate is fixed to a shell via the plurality of fixing members, and the first mounting plate is engaged with the second mounting plate to fix the electronic device and the shell.

7. The base of claim 6, wherein the first mounting plate defines a plurality of first fixing holes, the plurality of fixing members is engaged with the plurality of first fixing holes and is fixed to the electronic device.

8. An electronic device assembly comprising:
an electronic device; and
a base comprising a mounting plate and two standing pieces, and the two standing pieces are rotatably fixed to the mounting plate;
wherein the two standing pieces are configured to rotate from a closed position to an open position, when the two standing pieces are in the closed position, the mounting plate supports the electronic device; and when the two pieces are in the open position, the two pieces clamp the electronic device; the mounting plate comprises a first mounting plate and a second mounting plate, the first mounting plate comprises a connecting portion, the second mounting plate defines a connecting groove, and the connecting portion is engaged with the connecting groove; the first mounting plate comprises a first plate, and the connecting portion is formed by a recess of the first plate; a cross section of each connecting portion is substantially trapezoidal.

9. The electronic device assembly of claim 8, wherein when the two standing pieces are in the closed position, the electronic device is horizontally located on the base; and when the two pieces are in the open position, the electronic device is substantially perpendicular to the base.

10. The electronic device assembly of claim 8, wherein the first plate defines two locking holes, the second mounting plate comprises two protrusions, and two protrusions are received in the two locking holes to prevent the connecting portion from moving out of the connecting groove.

11. The electronic device assembly of claim 10, wherein the second mounting plate comprises a second plate and two strips, the two strips extend from one end of the second plate, the two protrusions are located on the two strips, and the two strips are configured to be deformed to push the two protrusions out of the two locking holes.

12. The electronic device assembly of claim 8, wherein the first plate defines a receiving space, the two standing pieces are rotatably fixed to two sides of the receiving space, each standing piece comprises an outer surface, and when the two standing pieces are in the closed position, the outer surface and the first plate are substantially aligned in a plane.

13. The electronic device assembly of claim 8 further comprises a plurality of fixing members, wherein the first mounting plate is fixed to the electronic device via the plurality of fixing members, the second mounting plate is fixed to a shell via the plurality of fixing members, and the first mounting plate is engaged with the second mounting plate to fix the electronic device and the shell.

* * * * *